(12) United States Patent
Hangleiter

(10) Patent No.: US 6,309,150 B1
(45) Date of Patent: Oct. 30, 2001

(54) CHUCK ACTUATOR

(75) Inventor: Eugen Hangleiter, Hermaringen (DE)

(73) Assignee: Rohm GmbH, Sontheim (DE)

( * ) Notice: Subject to any disclaimer, the term of this patent is extended or adjusted under 35 U.S.C. 154(b) by 0 days.

(21) Appl. No.: 09/505,908

(22) Filed: Feb. 17, 2000

(30) Foreign Application Priority Data

Feb. 27, 1999 (DE) .............................................. 199 08 545

(51) Int. Cl.$^7$ ...................................................... B23C 1/06
(52) U.S. Cl. .......................................... 409/131; 409/233
(58) Field of Search .................................... 409/131, 231, 409/233; 279/2.09, 4.12, 4.02, 134, 135

(56) References Cited

U.S. PATENT DOCUMENTS

| | | | |
|---|---|---|---|
| 4,604,012 | * | 8/1986 | Kawasaki et al. .................... 409/233 |
| 5,662,442 | * | 9/1997 | Taki et al. ............................. 409/233 |
| 5,865,578 | | 2/1999 | Benedikter . |

* cited by examiner

*Primary Examiner*—Daniel W. Howell
(74) *Attorney, Agent, or Firm*—Herbert Dubno; Andrew Wilford

(57) ABSTRACT

A chuck actuator has a main housing, a tube shaft having an outer end adjacent the main housing and an inner end remote from the main housing, a core shaft axially displaceable in the tube shaft between advanced and retracted positions, and a holding device on the outer shaft ends engageable with a tool or workpiece for holding same in the retracted position of the core shaft. A coupling member fixed on the core-shaft rear end and a housing member limitedly axially displaceable relative to the main housing and juxtaposed with the coupling member have formations including a radially projecting lug on one of the members and a radially open groove on the other of the members receiving the lug with play so that the lug can move limitedly axially in the groove. An actuating body axially displaceable in the main housing has a surface axially engageable with the coreshaft rear end and a pair of inwardly directed surfaces respectively engageable with the housing member and main housing. The surfaces are spaced such that, when one of the surfaces bears axially inward on the main housing, the other of the surfaces bears axially inward on the housing member to displace it axially inward and generally center the lug in the groove. The actuating body is moved outward to displace the core shaft into the advanced position and inward to allow the core shaft to move into the retracted position and displace the housing member to center the lug in the groove.

9 Claims, 2 Drawing Sheets

CHUCK ACTUATOR

FIELD OF THE INVENTION

The present invention relates to a chuck actuator and to a method of operating a chuck actuator. More particularly this invention concerns a spindle assembly used to actuate a chuck at an outer end of the spindle assembly.

BACKGROUND OF THE INVENTION

A spindle assembly used to rotate and hold a machine tool or workpiece typically comprises inner and outer coaxial shafts having front and rear ends and extending along a common axis with the inner shaft axially displaceable in the outer shaft, a holding device or chuck on the front ends adapted to grip a tool or workpiece in an axially outwardly displaced position of the inner shaft relative to the outer shaft, a coupling ring fixed on the rear end of the outer shaft, and an actuator having a piston axially engageable with the rear end of the inner shaft and operable to axially shift the inner shaft in the outer shaft. Springs normally urge the inner shaft inward so, absent pressurization of the cylinder surrounding the piston, these springs maintain the assembly in the holding position in which it solidly grips the workpiece or tool. When thus held, the shafts are rotated at high speed for the desired machining operation.

The spindle assembly described in US Pat. No. 5,865,578 has inner and outer coaxial shafts having front and rear ends and extending along a common axis with the inner shaft axially displaceable in the outer shaft, a holding assembly on the front ends adapted to grip a tool or workpiece in an axially outwardly displaced position of the inner shaft relative to the outer shaft, a coupling ring fixed on the rear end of the outer shaft, and an actuator having a piston axially engageable with the rear end of the inner shaft and operable to axially shift the inner shaft in the outer shaft. Complementarily interengaging formations on the actuator and the coupling ring including a is groove and a projection are displaceable between a holding position axially securing the ring on the actuator and a freeing position allowing the ring to be axially separated from the actuator.

When the actuator is connected with the shafts, the formations can be engaged together to allow the actuator to operate the chuck. In this position the holding device can be opened to allow a workpiece or tool to be taken off or set in place, to which end the actuator axially displaces the piston into an outer end position. Once the tool or workpiece is properly engaged in the holding device, the shafts can be rotated to perform the desired machining operation.

In order to prevent the actuator from rotating with the shafts and to surely separate the rotating parts—the shafts and holding device—from the nonrotating parts—the actuator—the two relatively movable parts of the housing are pushed apart by compression springs so that the formations can move out of contact with one another. To dechuck the tool or workpiece the piston is moved oppositely so that the formations are again engaged and as a result the shaft bearings are relieved of forces from the piston. This relief is not complete since the bearings must at least take up the force of the springs used to relatively displace the housing parts.

OBJECTS OF THE INVENTION

It is therefore an object of the present invention to provide an improved chuck actuator.

Another object is the provision of such an improved chuck actuator which overcomes the above-given disadvantages, that is which is of simple construction certain to have a long service life.

Another object is to provide an improved method of operating a chuck actuator which eliminates the need for the above-described springs between the housing parts

SUMMARY OF THE INVENTION

A chuck actuator has according to the invention a main housing, a tube shaft having an outer end adjacent the main housing and an inner end remote from the main housing, and centered on an axis, a core shaft axially displaceable in the tube shaft between advanced and retracted positions and also having an inner end at the main housing and an outer end, and a holding device on the outer ends engageable with a tool or workpiece for holding same in the retracted position of the core shaft. A coupling member fixed on the core-shaft rear end and a housing member limitedly axially displaceable relative to the main housing and juxtaposed with the coupling member have formations including a radially projecting lug on one of the members and a radially open groove on the other of the members receiving the lug and of an axial dimension substantially greater than an axial dimension of the lug so that the lug can move limitedly axially in the groove. An actuating body axially displaceable in the main housing has a surface axially engageable with the core-shaft rear end and a pair of inwardly directed surfaces respectively engageable with the housing member and main housing. The surfaces are spaced such that, when one of the surfaces bears axially inward on the main housing, the other of the surfaces bears axially inward on the housing member to displace it axially inward and generally center the lug in the groove. The actuating body is moved outward to displace the core shaft into the advanced position and inward to allow the core shaft to move into the retracted position and displace the housing member to center the lug in the groove.

The system of this invention has the advantage that there are no springs at all between the two relatively movable housing parts. The housing member is positively positioned by the actuating body relative to the main housing so that the axial coupling formations are wholly out of contact with each other and the shafts can rotate freely relative to the actuator. This centered position is accurately set without the use of springs so the system is not normally under any spring load.

According to the invention the main housing and housing member form a cylinder and the actuating body is a piston axially displaceable in the cylinder and having an outer face forming the other surface. More particularly the main housing is provided with a pair of inlets connected to respective compartments formed by the piston in the cylinder. Thus pressurization of one or the other compartments effects the clamping or releasing actions. Only one of the compartments needs to be pressurized; the other can simply be connected to the sump. Once a new tool or workpiece is in place, the pressurization can be wholly relieved with the parts staying in the positions they were moved into The piston has a stem projecting axially inward through the main housing and housing member and formed with the surface engageable with the main housing. This protruding stem can even be used to feed a fluid under pressure through the piston and core shaft to the chuck at the outer ends of the shafts.

The main housing in accordance with the invention is formed with a sleeve extending axially outward and forming a guide on which the housing member is slidable. Thus the main housing, which is typically stationary, carries the housing member that is limitedly axially movable relative to it.

According to the invention the main housing is formed with a radially inwardly open pocket, normally an annular groove, and the housing member is provided with a radially outwardly projecting lug engaged in the pocket and limitedly axially displaceable therein so that axial travel of the housing member relative to the main housing is limited by the lug and pocket. Thus the two housing parts form a simple subassembly.

The chuck actuator further has according to the invention a detectable element axially fixed on the outer shaft, and means in including a sensor for detecting the element on the housing member. This allows a controller that operates the valves connected between a source of pressurized fluid and the two inlets for the compartments to be operated in accordance with the actual position of the chuck.

With the system of this invention a workpiece or tool is secured in a holding device of a chuck actuator by pressurizing the outer compartment to shift the piston inward, move the core shaft into the retracted position, engage the other surface with the housing member to center the lug in the groove, and finally engage the one surface with the main housing to arrest the piston with the lug centered in the groove. The workpiece or tool is released from the holding device of the chuck actuator by pressurizing the inner compartment to shift the piston outward, move the surfaces out of engagement with the housing member and main housing, and engage the lug with an outer end of the groove. Once again, it is merely necessary to pressurize one of the compartments to achieve the desired positioning of the parts. Since no springs are involved between the relatively movable housing parts, the parts remain in the positions they are set in, even if the compartment pressurized to get them there is depressurized.

BRIEF DESCRIPTION OF THE DRAWING

The above and other objects, features, and advantages will become more readily apparent from the following description, reference being made to the accompanying drawing in which.

SPECIFIC DESCRIPTION

Figure 1:
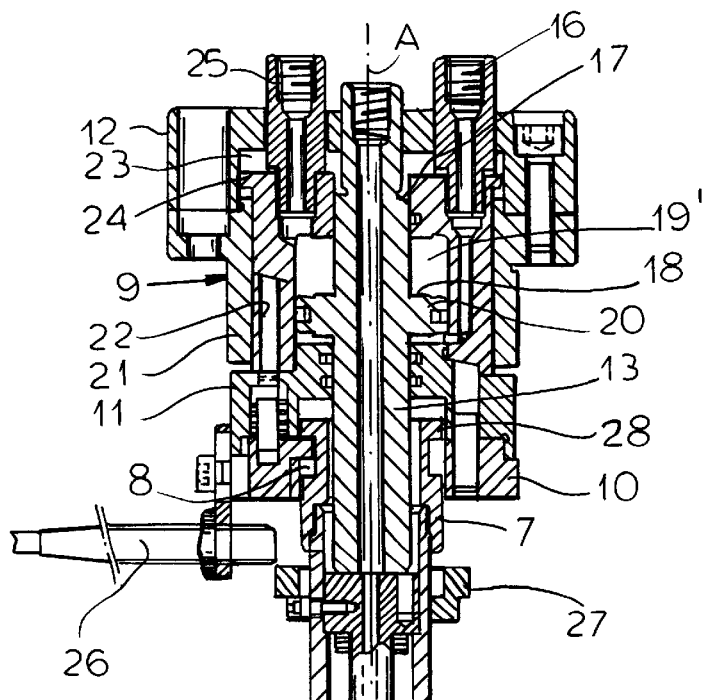
FIG. 1 is an axial section through the assembly according to the invention in the freeing position.
Figure 1:
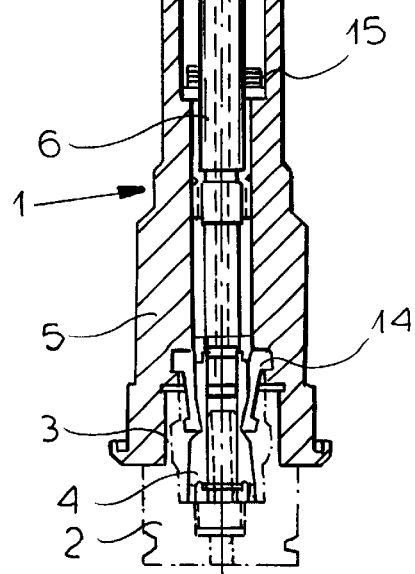
Figure 2:
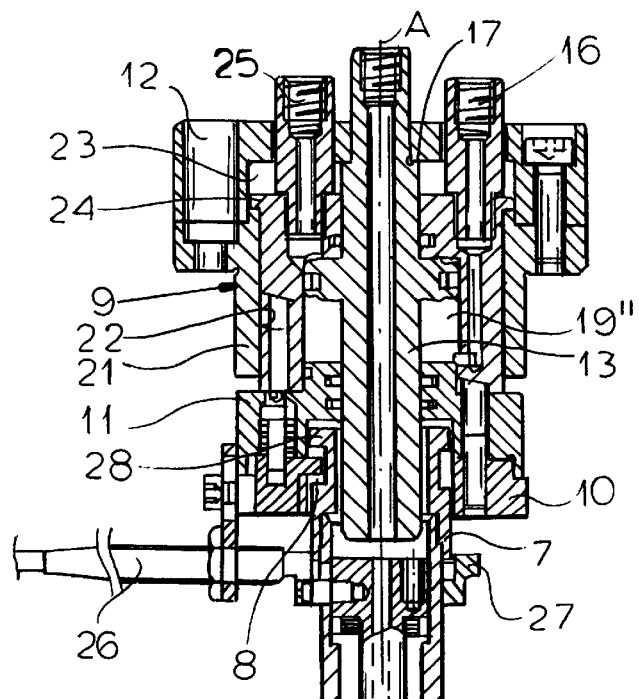
FIG. 2 is an axial section through the assembly in the holding position.
Figure 2:
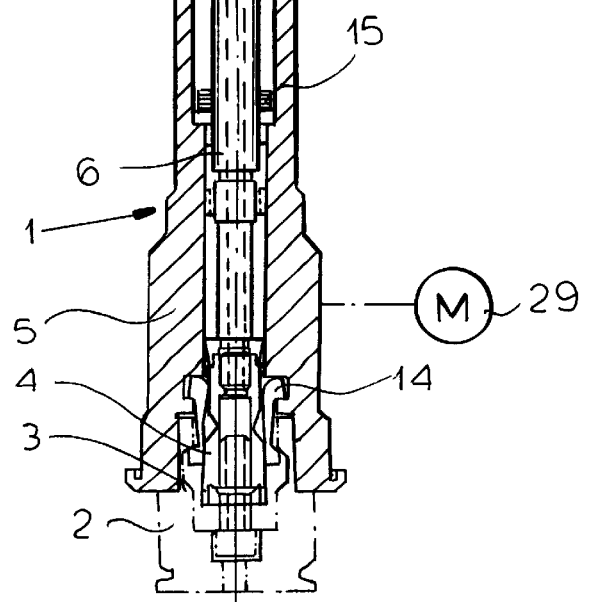

As seen in FIGS. 1 and 2 a chuck actuator 1 according to the invention is adapted to hold a tool or workpiece 2 having a standard undercut sleeve 3. The actuator 1 has a chuck cone 4 carried at the outer end of a core shaft 6 displaceable along an axis A in a coaxial outer tube shaft 5 having an inner end fixed to a coupling ring 7 formed with a radially outwardly open groove 8. A stack of spring washers 15 braced between the shafts 5 and 6 normally pulls back the cone 4 to deflect jaws 14 outward and hold the sleeve 3 of the workpiece 2. A disk 27 carried on the outer shaft 5 is juxtaposed with a sensor 26 in the FIG. 2 holding position of the assembly. A drive indicated schematically at 29 can rotate the shafts 5 and 6 about the axis A.

An actuating unit 9 basically comprises an axially displaceable outer housing 11 having a ring 10 provided with lugs 28 engaged with axial play in the groove 8 and an axially fixed main housing 12 forming with the outer housing 11 a pair of compartments 19' and 19" axially flanking a piston 20 carried on an axially displaceable piston body 13 engageable with the rear end of the core shaft 6. The piston body 13 is formed with axially inwardly directed surfaces 17 and 18 that are engageable respectively with the housing 12 and the housing 11. The housing 12 has an axially outwardly directed collar 21 having a cylindrical inner surface 22 on which the housing 11 can slide axially. In addition the housing 12 is formed with a radially inwardly opening groove 23 in which engages a rim or lugs 24 of the housing 11 to limit its axial movement relative to the housing 12. Inlet fittings 16 and 25 are provided for pressurizing the compartments 19' and 19".

FIG. 1 shows the system in the freeing or releasing position. To get into this position the rear chamber 19' is pressurized via the inlet 25 so as to force the piston body 13 outward. This action engages the outer piston end with the rear end of the shaft 6 and pushes it outward, and simultaneously entrains the outer shaft 5 whose movement is, however, stopped when the lugs 28 come into contact with the rear end of the groove 8. Thus the shaft 5 is advanced and the jaws 11 can pivot in to release the workpiece 2.

FIG. 2 shows the system in the holding position. Here the outer compartment 19" has been pressurized to move back the piston body 13. This action first of all pulls the outer end of the piston body 13 out of engagement with the core shaft 6 so that the springs 15 can expand and retract the cone 4, thereby locking the workpiece 2 in place. Then the surface 18 engages the housing 11 to pull it back until the lugs 28 are centered in the groove 8, wholly out of contact with the coupling ring 7, and the surface 17 bottoms on the housing 12, stopping further inward movement of the piston body 13 in this position with the lugs 28 centered in the groove 8. In this position the entire actuating assembly 9 is effectively disconnected from the shafts 5 and 6 so they can be rotated at high speed by the drive 29 for the desired machining operation.

I claim:

1. A chuck actuator comprising:

a main housing;

a tube shaft having an outer end adjacent the main housing and an inner end remote from the main housing, and centered on an axis;

a core shaft axially displaceable in the tube shaft between advanced and retracted positions and also having an inner end at the main housing and an outer end;

a holding device on the outer ends engageable with a tool or workpiece for holding same in the retracted position of the core shaft;

a coupling member fixed on the core-shaft rear end;

a housing member limitedly axially displaceable relative to the main housing and juxtaposed with the coupling member;

formations including a radially projecting lug on one of the members and a radially open groove on the other of the members receiving the lug and of an axial dimension substantially greater than an axial dimension of the lug, whereby the lug can move limitedly axially in the groove;

an actuating body axially displaceable in the main housing, having a surface axially engageable with the core-shaft rear end, and having a pair of inwardly directed surfaces respectively engageable with the housing member and main housing, the surfaces being spaced such that when one of the surfaces bears axially inward on the main housing the other of the surfaces bears axially inward on the housing member to displace it axially inward and generally center the lug in the groove; and means for moving the actuating body outward to displace the core shaft into the advanced position and inward to allow the core shaft to move into the retracted position and to displace the housing member to center the lug in the groove.

2. The chuck actuator defined in claim 1 wherein the main housing and housing member form a cylinder, the actuating body being a piston axially displaceable in the cylinder and having an outer face forming the other surface.

3. The chuck actuator defined in claim 2 wherein the main housing is provided with a pair of inlets connected to respective compartments formed by the piston in the cylinder.

4. The chuck actuator defined in claim 1 wherein the piston has a stem projecting axially outward through the main housing and forming the one surface.

5. The chuck actuator defined in claim 1 wherein the main housing is formed with a sleeve extending axially outward and forming a guide on which the housing member is slidable.

6. The chuck actuator defined in claim 1 wherein the main housing is formed with a radially inwardly open pocket and the housing member is provided with a radially outwardly projecting lug engaged in the pocket and limitedly axially displaceable therein, whereby axial travel of the housing member relative to the main housing is limited by the lug and pocket.

7. The chuck actuator defined in claim 1 further comprising:

a detectable element axially fixed on the outer shaft; and means in including a sensor for detecting the element on the housing member.

8. A method of securing a workpiece or tool in a holding device of a chuck actuator including a main housing;

a tube shaft having an outer end adjacent the main housing and an inner end remote from the main housing and centered on an axis;

a core shaft axially displaceable in the tube shaft between advanced and retracted positions and also having an inner end at the main housing and an outer end remote from the main housing, the holding device being mounted on the outer ends and engageable with a tool or workpiece for holding same in the retracted position of the core shaft;

a coupling member fixed on the core-shaft rear end;

a housing member limitedly axially displaceable relative to the main housing and juxtaposed with the coupling member, the main housing and housing member forming a cylinder;

formations including a radially projecting lug on one of the members and a radially open groove on the other of the members receiving the lug and of an axial dimension substantially greater than an axial dimension of the lug, whereby the lug can move limitedly axially in the groove; and a piston axially displaceable in the main housing, having a surface axially engageable with the core-shaft rear end, subdividing the cylinder into inner and outer compartments, and having a pair of inwardly directed surfaces respectively engageable with the housing member and main housing, the surfaces being spaced such that when one of the surfaces bears axially inward on the main housing the other of the surfaces bears axially inward on the housing member to displace it axially inward and generally center the lug in the groove, the method comprising the step of pressurizing the outer compartment to shift the piston inward, move the core shaft into the retracted position, engage the other surface with the housing member to center the lug in the groove, and finally engage the one surface with the main housing to arrest the piston with the lug centered in the groove.

9. A method of release a workpiece or tool from a holding device of a chuck actuator including a main housing;

a tube shaft having an outer end adjacent the main housing and an inner end remote from the main housing and centered on an axis;

a core shaft axially displaceable in the tube shaft between advanced and retracted positions and also having an inner end at the main housing and an outer end remote from the main housing, the holding device being mounted on the outer ends and engageable with a tool or workpiece for holding same in the retracted position of the core shaft;

a coupling member fixed on the core-shaft rear end;

a housing member limitedly axially displaceable relative to the main housing and juxtaposed with the coupling member, the main housing and housing member forming a cylinder;

formations including a radially projecting lug on one of the members and a radially open groove on the other of the members receiving the lug and of an axial dimension substantially greater than an axial dimension of the lug, whereby the lug can move limitedly axially in the groove; and a piston axially displaceable in the main housing, having a surface axially engageable with the core-shaft rear end, subdividing the cylinder into inner and outer compartments, and having a pair of inwardly directed surfaces respectively engageable with the housing member and main housing, the surfaces being spaced such that when one of the surfaces bears axially inward on the main housing the other of the surfaces bears axially inward on the housing member to displace it axially inward and generally center the lug in the groove, the method comprising the step of pressurizing the inner compartment to shift the piston outward, move the surfaces out of engagement with the housing member and main housing, and engage the lug with an outer end of the groove.

* * * * *